Figure 1:
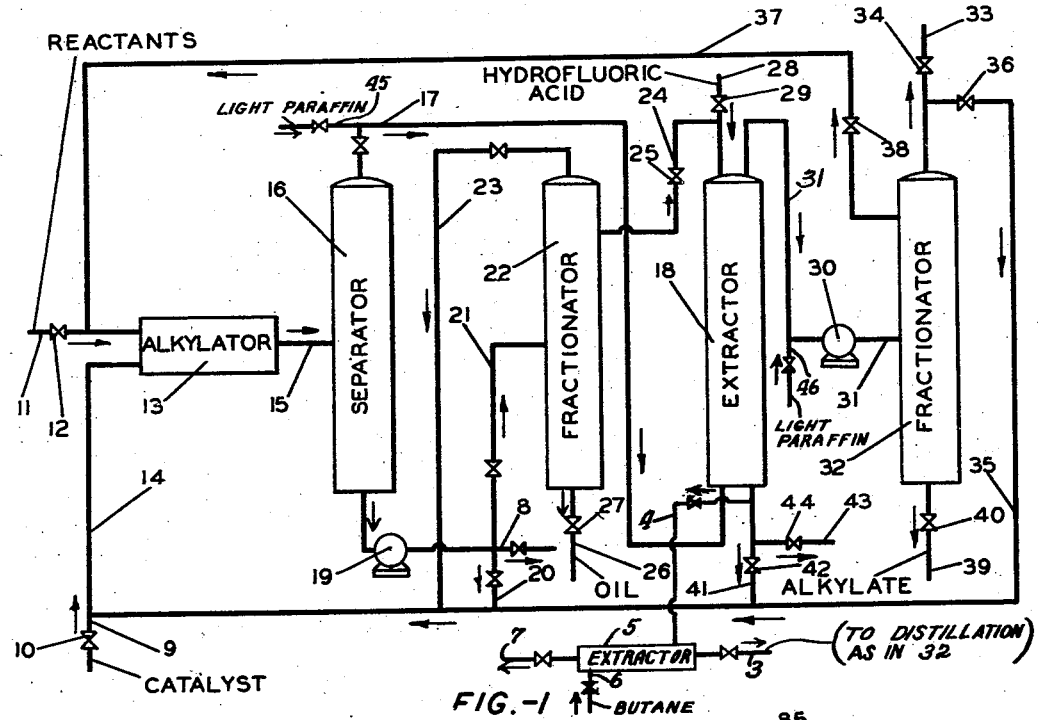

Sept. 24, 1946.  M. P. MATUSZAK  2,408,173

TREATMENT OF AROMATIC HYDROCARBON MATERIALS

Filed May 26, 1943

INVENTOR
M. P. MATUSZAK
BY Hudson, Young & Yinger
ATTORNEYS

Patented Sept. 24, 1946

2,408,173

UNITED STATES PATENT OFFICE

2,408,173
TREATMENT OF AROMATIC HYDROCARBON MATERIALS

Maryan P. Matuszak, Bartlesville, Okla., assignor to Phillips Petroleum Company, a corporation of Delaware Application May 26, 1943, Serial No. 488,547

25 Claims. (Cl. 260—671)

This invention relates to treatment of aromatic hydrocarbon materials and more particularly to the removal of organic fluorine compounds and other undesirable compounds from such materials by treatment with liquid hydrofluoric acid. This invention is a continuation-in-part of my copending application, Serial No. 395,282, filed May 26, 1941, now United States Patent 2,320,629, issued June 1, 1943.

In the synthesis of aromatic hydrocarbons by processes in which fluorine-containing catalysts are used, small proportions of organic fluorine-containing by-products are formed. Among such processes, one of the most important is the alkylation of aromatic hydrocarbons, such as benzene, toluene, and the like, with alkylating agents, such as olefins, polar alkyl compounds, and the like, in the presence of catalysts comprising one or more of such fluorine compounds as hydrofluoric acid, boron fluoride, and the like. Although the exact nature of composition of the fluorine-containing by-products has not been completely investigated, they are believed to be mostly alkyl and/or aryl fluorides, such as may be derived from the alkylating agent and/or the original aromatic hydrocarbon. These by-products are not completely removed by washing the hydrocarbons with alkaline solutions. They tend to decompose at elevated temperatures, such as those employed in fractional distillation of the hydrocarbons, thereby forming hydrofluoric acid, which is corrosive, especially in the presence of moisture.

In the afore-mentioned copending application is disclosed treating of predominantly saturated hydrocarbon materials, specifically paraffin hydrocarbons, with liquid hydrofluoric acid to remove organic fluorine compounds. It has now been found that treatment of aromatic hydrocarbon materials with liquid hydrofluoric acid effects advantageous removal of organic fluorine compounds and of other compounds, such as alkylating agents, boron fluoride, and sulfur compounds.

An object of this invention is to purify aromatic hydrocarbon materials.

Another object of this invention is to remove undesirable organic fluorine-containing compounds from aromatic hydrocarbon materials.

Other objects and advantages will be apparent from the following description, the accompanying drawing, and/or the appended claims.

According to this invention, removal of organic fluorine compounds and other compounds that are relatively highly soluble in hydrofluoric acid from aromatic hydrocarbon materials is effected by contacting the material in liquid phase with liquid anhydrous hydrofluoric acid at a suitable temperature, which may be between about −100° and about 350° F. depending somewhat upon the particular material, but which usually is optimally between about 20° and 100° F., separating the hydrofluoric acid extract from the hydrocarbon material, and freeing the treated hydrocarbon material from a small proportion of dissolved hydrofluoric acid. The hydrofluoric acid should be used in sufficient amount to form a distinct liquid acid phase; preferably it should be at least several times this amount. The amount needed may vary with the content of fluorine-containing by-products, but the minimum amount for any particular case may be readily found by trial; an amount between 20 and 100 per cent by volume of the hydrocarbon material is generally satisfactory, but for high contents of fluorine-containing by-products, it may greatly exceed 100 per cent. Because the mutual solubility of aromatic hydrocarbons and liquid hydrofluoric acid increases appreciably with increase in temperature, elevated temperatures should usually be avoided; for example, the solubility of benzene in liquid hydrofluoric acid increases from 2.0 weight per cent at 20° F. to 5.0 weight per cent at 100° F. However, in some instances the treatment may be advantageously carried out at an elevated temperature, after which, for improved mechanical separation of the hydrocarbon material and the acid, the temperature may be lowered, say to a temperature in the range of 10° to 50° F.

Separation of the acid and the hydrocarbon phases is usually effected by gravitational settling, aided if desired by cooling. Centrifugation may be used, but ordinarily it is not necessary.

Freeing of the treated hydrocarbon material from dissolved hydrofluoric acid may be effected by various means, such as distilling, washing with water or alkaline solutions, contacting with metal salts or other compounds capable of combining with hydrogen fluoride, or the like. However, it is generally advantageous to remove the dissolved hydrofluoric acid by fractional distillation as a low-boiling or azeotropic mixture with a low-boiling paraffin having three to five carbon atoms per molecule, preferably a butane. To this end, such a paraffin is added to the hydrocarbon material before, during, or after the contacting with liquid hydrofluoric acid, usually most advantageously after the acid phase has been withdrawn from the hydrocarbon material. Because of its relative inertness, this paraffin is preferably straight-chain rather than branched-chain. This paraffin forms a minimum-boiling azeotropic mixture with hydrofluoric acid. Under the proper conditions, the overhead fraction obtained on fractional distillation is such an azeotropic mixture; however, in actual plant practice, when close control is not feasible, the composition of the overhead fraction may depart somewhat from the exact composition of the azeotropic mixture at the pressure in use, although the process will have taken advantage of the principle involved. The low-boiling fraction carries with it, in the form of a low-boiling mixture, any hydrofluoric acid remaining in solution in the hydrocarbon material, thereby effecting removal of the dissolved acid without the loss of acid that would occur if the removal were made by water-washing, alkali-washing, or the like, and without the increase in temperature that would be necessary for removal of the acid by simple fractional distillation. Simple fractional distillation of the dissolved hydrofluoric acid, without prior addition of a low-boiling paraffin, also may be practiced. The acid removed by either type of fractional distillation is generally suitable for re-use in the treatment of additional hydrocarbon material.

Although the action of the hydrofluoric acid is not completely understood at present, it appears to be due chiefly to a preferential solubility of organic fluorine compounds in the acid. Any procedure that effects an intimate contacting between the acid and the hydrocarbon phases, such as those well-known in the art of extracting with preferential solvents, is suitable. Unduly prolonged contacting, in cases in which the acid may react slowly with the aromatic hydrocarbon to yield organic fluorine compounds, should be avoided. The contacting preferably should be effected in apparatus not subject to excessive attack by hydrofluoric acid.

As olefin and nonolefin alkylating agents may react with hydrofluoric acid to form organic fluorine compounds, the hydrocarbon materials to be treated by this process should be substantially free from alkylating agents. However, relatively small proportions of unsaturated hydrocarbons or other alkylating agents may be present, for the fluorine compounds formed by reaction with the acid are preferentially dissolved by the acid and are removed; in consequence, the treated material is freed not only from organic fluorine compounds but also from unsaturated hydrocarbons and/or other alkylating agents. Similarly, many sulfur compounds are preferentially dissolved by the acid and are removed, so that the present process may be applied to the purification of sulfur-containing hydrocarbon materials.

The hydrofluoric acid extract is usually passed to a catalytic hydrocarbon conversion step to be used as catalyst. When not so used it is treated to recover the acid, which is then re-used. In such a case, since this acid extract contains considerable dissolved aromatic hydrocarbon, it is preferably preliminarily extracted with a low-boiling paraffin of three to five carbon atoms per molecule, such as for example normal butane. The extraction is preferably made at a low temperature, such as approximately 30° to 60° F., which may be conveniently obtained by direct evaporative cooling, especially when the paraffin is propane. The resulting paraffin extract is fractionally distilled to recover the aromatic hydrocarbon, which is returned to the treated hydrocarbon material. The propane-extracted acid extract is preferably also fractionally distilled, whereby the hydrofluoric acid is recovered in an overhead fraction in condition suitable for re-use, and any undecomposed organic fluorine compounds are withdrawn in an oily kettle fraction.

Understanding of some aspects of this invention may be facilitated by reference to the two figures of the accompanying exemplifying drawing, which are schematic flow diagrams illustrating specific embodiments of the invention for the treatment of aromatic hydrocarbons produced by alkylation in the presence of a fluorine-containing catalyst. For the alkylation of benzene or toluene with an olefin or a nonprimary alcohol having three to five carbon atoms per molecule, this catalyst is suitably hydrofluoric acid. For alkylation with ethylene, however, this catalyst is preferably, but not necessarily, promoted by a minor proportion of boron fluoride, such as approximately 1 to 5 mol per cent. Some benefit appears to result from the presence of a small proportion of moisture in the hydrofluoric acid-boron fluoride catalyst; when an alcohol is the alkylating agent, water is formed as a by-product of the alkylation.

In the embodiment of Figure 1, the alkylation reactants enter the system by one or more inlets, represented by inlet 11 controlled by valve 12. For the sake of simplicity, the reactants may be taken to be benzene and ethylene, without restricting the invention thereto. These reactants pass into alkylator 13, in which they are intimately mixed with the catalyst, which enters the system through inlet 9 controlled by valve 10. As has been indicated, the catalyst may be different for different alkylating agents; in the present specific instance, it comprises substantially anhydrous hydrofluoric acid and a minor proportion, usually about 3 mol per cent, of boron fluoride. Alkylator 13 may be any convenient reaction vessel having an agitating means and capable of withstanding the alkylating conditions. The reaction temperature may be broadly in the range of about 50 to about 400° F. The optimum temperature range differs for different alkylating agents, being generally lower the higher the number of carbon atoms in the alkylating agent; in the present specific instance, it is usually preferably in the range of 100 to 200° F. The pressure may be as high as is desired, but it need be only sufficient to maintain substantially all of the reaction mixture in the liquid state. The average reaction time, or the time of residence of the hydrocarbon phase in the alkylator, generally may vary in the range of about 1 to 100 minutes or more, depending upon the other reaction conditions; a time of 5 to 15 minutes, more specifically 10 minutes, is usually preferred. Conditions outside of these ranges are suitable in some cases; the optimum conditions for any particular case may be readily determined by trial by one skilled in the art. The mol ratio of benzene to ethylene in the feed should be well in excess of 1:1, preferably at least 10:1, since the alkylation results generally improve with increase in the benzene-to-alkylating agent ratio. The proportion of catalyst preferably is in the range of about 0.2 to 4 times the weight of hydrocarbon in the reaction mixture.

After a suitable contact period, the resulting alkylation mixture is passed through conduit 15 into separator 16, in which it is separated into a hydrocarbon phase and an acid or catalyst phase. The hydrocarbon phase is passed through valved conduit 17 into treater or extractor 18. As previously discussed a light (or low-boiling) paraffin, such as a butane, may be added to the aromatic hydrocarbon material prior to its extraction with liquid hydrofluoric acid. If such an operation is practiced, a suitable amount of such a paraffin may be added through conduit 45 leading into conduit 17. The alkylation catalyst phase may be discharged in part or entirely from the system through valved conduit 8, or it may be recycled, at least in part, as by pump 19, through valved conduit 20 and acid-recycle conduit 14, back to alkylator 13; however, at least a part of it is preferably passed through valved conduit 21 into fractionator 22. In this fractionator, the catalyst phase is fractionally distilled into the following fractions; a fraction, comprising chiefly boron fluoride, hydrofluoric acid, and some low-boiling organic fluorine compounds, that is passed through valved conduit 23 into recycle conduit 14, by which it is recycled to alkylator 13; a fraction, comprising chiefly hydrofluoric acid, that is passed through conduit 24 controlled by valve 25 into extractor 18; and a fraction, comprising unreacted benzene which was dissolved in the catalyst phase and acid-soluble organic compounds of relatively high molecular weight, including some fluorine-containing compounds, that is withdrawn through outlet 26 controlled by valve 27. The unreacted benzene may be recovered, as by fractional distillation, and may be returned to the system, by means not shown.

In extractor 18, the hydrocarbon phase entering from conduit 17 is contacted in a countercurrent manner with the hydrofluoric acid entering from conduit 24, whereby unreacted alkylating agent, dissolved boron fluoride, and organic fluorine-containing by-products of the alkylation step are removed from the hydrocarbon phase, presumably by preferential solution in the acid. Hydrofluoric acid sufficient to compensate for any losses occurring anywhere in the system may be added through inlet 28 controlled by valve 29; if desired, this make-up acid may be advantageously added to extractor 18 at a point downstream, in the hydrocarbon stream, to the point of entry of the hydrofluoric acid from fractionator 22. Any losses of boron fluoride are made up by addition of this promoter through inlet 9.

From extractor 18 the treated hydrocarbon material is forced, as by pump 30, through conduit 31 into fractionator 32, in which it is fractionally distilled into the following fractions: a relatively small light fraction that may be withdrawn through outlet 33 controlled by valve 34 but that usually is passed, at least in part, to alkylator 13, as through conduit 35 controlled by valve 36, since it comprises chiefly hydrofluoric acid that was carried in solution in the treated hydrocarbon material coming from the extractor 18; a relatively large medium fraction that is practically acid-free and that is recycled to alkylator 13, as through conduit 37 controlled by valve 38, since it comprises chiefly unreacted benzene; and an alkylate fraction comprising chiefly, in this specific embodiment, ethylbenzene, that is withdrawn through outlet 39 controlled by valve 40 to storage or to additional processing steps, not shown, such as concentration steps, dehydrogenation steps to convert ethylbenzene to styrene, or the like. If it is desired to conduct this distillation in the presence of a light (or low-boiling) paraffin, as previously discussed, and such has not been added through conduit 45, a suitable amount of such a paraffin may be added through conduit 46 leading into conduit 31.

From extractor 18 the hydrofluoric acid extract is preferably passed through conduit 41 controlled by valve 42 and through recycle conduit 14 to alkylator 13, to be used in the alkylation step; if desired, however, any part of the extract may be withdrawn from the system through outlet 43 controlled by valve 44. The preferentially dissolved compounds carried by this extract to alkylator 13 advantageously enter, at least in part, into the alkylation, thereby increasing the overall yield of alkylate. If it is desired to extract dissolved aromatic hydrocarbons from the hydrofluoric acid phase with a light (low-boiling) paraffin of three to five carbon atoms per molecule, as previously discussed, any part or all of the catalyst phase passed from the bottom of extractor 18 may be passed through valved conduit 4 to extractor 5, wherein it is contacted with a liquid, low-boiling paraffin, such as normal butane, introduced through conduit 6. The extracted hydrofluoric acid, now relatively free of aromatic hydrocarbons, is passed through conduit 7 for suitable treatment, as discussed. The liquid extract, containing aromatic hydrocarbons and some dissolved hydrogen fluoride, is discharged through conduit 3 and, if desired, may be subjected to distillation in suitable equipment, such as illustrated by fractionator 32.

Figure 2:
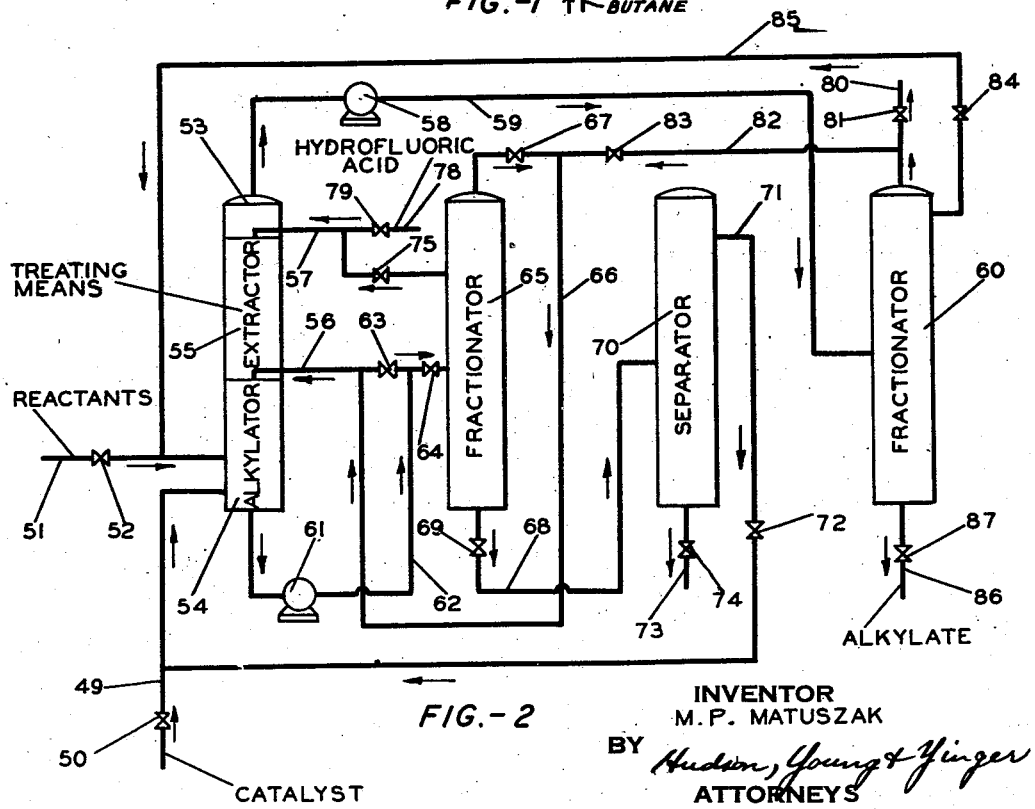

In the embodiment of Figure 2, the alkylation reactants and the alkylation catalyst, which again for the sake of simplicity may be taken to be benzene and ethylene and hydrofluoric acid promoted by boron fluoride, respectively, enter the system by one or more inlets, such as inlet 51 controlled by valve 52 and inlet 49 controlled by valve 50, respectively, into treating means 53. In this means, the hydrocarbons pass generally upwardly through a lower, alkylator section 54 and then upwardly through an upper, extractor section 55. In the alkylator section they are intimately contacted in a generally countercurrent manner with the catalyst, which enters at least in part at the top of the alkylator section from acid-recycle conduit 56, whereupon alkylation occurs. On passing upwardly into and through the extractor section, the resulting hydrocarbon mixture is countercurrently contacted with substantially pure anhydrous hydrofluoric acid that enters the upper part of the extractor section from conduit 57, whereupon organic fluorine-containing by-products, boron fluoride, and unconsumed alkylating agents are removed from the hydrocarbon mixture. From the upper part of treating means 53, which extends upwardly somewhat beyond extractor section 55 to preclude substantial entrainment of the acid phase, the extracted hydrocarbon mixture is forced as by pump 58, through conduit 59 into fractionator 60.

The hydrofluoric acid entering treating means 53 from conduit 57 passes downwardly through extractor section 55 and then joins the catalytic material entering from conduit 56. When the catalyst comprises boron fluoride, as in the present specific instance, the proportion of boron fluoride entering through inlet 49 is preferably so adjusted that the average composition of the catalyst in alkylator section 54 is that desired, such as for example 1 to 5 mol per cent of boron fluoride and 95 to 99 mol per cent hydrofluoric acid. When the catalyst is substantially pure hydrofluoric acid and does not comprise boron fluoride, as when the alkylating agent is relatively highly reactive or is an olefin or nonprimary alcohol of three to five carbon atoms per molecule, all fresh catalyst, namely hydrofluoric acid, may enter the system through inlet 78 controlled by valve 79, in which case inlet 49 may be omitted or unused. In alkylator section 54 the catalyst is intimately mixed with the alkylation mixture in any desired manner, but the general direction of the acid continues to be downward. From the bottom of the alkylator section, the acid or catalyst phase is forced, as by pump 61, through conduit 62, valve 63, and conduit 56 back to the top of the alkylator section; however, instead of being thus recycled to the alkylation step, any desired part, or all, of it may be sent through valve 64 into fractionator 65 for purification or revivification, and ordinarily in commercial operation a part is so sent either continuously or intermittently.

In fractionator 65, the acid phase is fractionally distilled into the following fractions: a fraction, comprising chiefly hydrofluoric acid, boron fluoride, and some organic fluorine compounds, that is passed through conduit 66 controlled by valve 67 and through conduit 56 into alkylator section 54; a fraction, comprising chiefly hydrofluoric acid, that is passed through valve 75 and conduit 57 into the upper part of extractor section 55; and a fraction, comprising benzene that was dissolved in the acid phase and acid-soluble organic compounds of relatively high molecular weight, including some fluorine-containing compounds, that is passed through conduit 68 controlled by valve 69 to separator 70. In separator 70, this fraction is heated to distill off the benzene and to decompose the fluorine compounds to liberate hydrofluoric acid; the benzene and the hydrofluoric acid are passed to alkylator section 54, as through conduit 71 controlled by valve 72. The residual high-boiling material is withdrawn from separator 70 through outlet 73 controlled by valve 74.

Hydrofluoric acid sufficient in amount to compensate for any losses occurring anywhere in the system is preferably added through inlet 78 controlled by valve 79; if desired, this make-up acid may be advantageously added to extractor section 55 at a point downstream, in the hydrocarbon stream, to the point of entry of the hydrofluoric acid from fractionator 65.

In fractionator 60, the extracted hydrocarbon mixture coming thereto through conduit 59 is fractionally distilled into the following fractions: a relatively small light fraction, comprising chiefly hydrofluoric acid, that may be withdrawn through outlet 80 controlled by valve 81 but that usually is recycled to some suitable point in the system, as by being passed through conduit 82 controlled by valve 83 into conduit 66 and thence to alkylator section 54; a relatively large medium fraction, comprising chiefly practically acid-free benzene, that is recycled through valve 84 and conduit 85 to alkylator section 54; and an alkylate fraction, chiefly ethylbenzene, that is withdrawn through outlet 86 controlled by valve 87 to storage or to additional processing steps, not shown.

In the embodiments of Figures 1 and 2, all of the hydrocarbon mixture resulting from the alkylation step is shown to be extracted with hydrofluoric acid. Extraction of all of this hydrocarbon mixture, however, is not always necessary; in fact, certain advantages follow if only the actual alkylate is so extracted. Thus, after the alkylation step and after separation of the hydrocarbon phase from the acid phase, the hydrocarbon phase may be passed into a fractionator, not shown, in which it is separated into two fractions. The light fraction, which comprises the unreacted benzene, the catalytic material dissolved in the hydrocarbon phase, and some of the organic fluorine compounds, is returned to the alkylation step; the alkylate fraction is extracted with liquid hydrofluoric acid to remove the residual organic fluorine compounds, and is then freed from dissolved hydrofluoric acid in accordance with the description already given. The hydrofluoric acid extract is preferably sent to the alkylation step, but if desired, part or all of it may be passed into a fractionator, in which it is freed by fractional distillation from higher-boiling organic compounds and from which it may be returned to the extraction step or sent to the alkylation step. The hydrofluoric acid phase separated from the alkylation mixture may be recycled directly to the alkylation step, or part or all of it may be similarly fractionally distilled in the same or a different fractionator, from which it may be returned to the alkylation step or sent to the extraction step, as is desired.

The hydrofluoric acid used in the extraction should be concentrated, and in some instances may be substantially anhydrous. Generally any small, fortuitous amount of water will not be deleterious, and at times it may be desirable to ensure the presence of a few per cent of water. In nearly all cases, however, concentrated hydrofluoric acid will refer to acid having a strength greater than 90 per cent, and most generally greater than 95 per cent. The same will be true for the hydrofluoric acid used for alkylation.

By fractionator, as used in this specification, is meant any system of fractional-distillation devices that will effect the results indicated; it may consist of one or more than one fractionating column, as is found to be necessary or desirable for any particular case in accordance with the well-known art of fractional distillation. Many other well-known devices not specifically shown or described in this specification, which are known to contribute to or improve the attainment of the results indicated herein, may be incorporated or used without passing beyond the scope of this invention or the spirit of this disclosure.

Some aspects of the invention are further illustrated by the following examples, which should not, however, be construed as necessarily limiting the invention.

*Example I*

Benzene was alkylated with propylene in a small continuous pilot plant comprising a 7450 cc. reactor having a 1725 R. P. M. turbomixer. The catalyst was anhydrous hydrofluoric acid; the volume ratio of hydrocarbons to catalyst in the reactor was maintained at 1.3:1. The mol ratio of benzene to propylene in the feed was 8.3:1. The temperature was 118° F.; the time of residence of the hydrocarbon phase in the reactor was 20.3 minutes. The yield of total alkylate was 249 per cent by weight of the propylene. The total alkylate contained 93.5 per cent by volume of isopropylbenzene, 5.5 per cent of diisopropylbenzene, and 1.0 per cent of heavier product. The isopropylbenzene fraction contained 0.0009 per cent by weight of organic fluorine and 0.0117 per cent by weight of organic sulfur.

When such an isopropylbenzene fraction is countercurrently extracted with approximately a third of its own volume of anhydrous hydrofluoric acid, the organic fluorine and sulfur are substantially completely removed, thereby improving the isopropylbenzene for use as an ingredient in high-octane aviation fuel. Because of the relatively high proportion of sulfur, the resulting hydrofluoric acid extract is preferably preliminarily freed from most of its content of sulfur compounds, which are relatively high-boiling, by fractional distillation before it is passed to the alkylation step.

*Example II*

Benzene is alkylated with ethylene in the presence of an approximately equal volume of hydrofluoric acid promoted with approximately 3 mol per cent of boron fluoride, at a temperature of approximately 150° F. and a contact time of approximately 10 minutes. The resulting mixture of hydrocarbons and catalyst is allowed to settle into a hydrocarbon phase and a catalyst phase. The hydrocarbon phase is countercurrently extracted with substantially pure anhydrous hydrofluoric acid, whereby it is freed from a small proportion of dissolved boron fluoride and organic fluorine compounds, among which is ethyl fluoride. The extracted hydrocarbon phase is freed from dissolved hydrofluoric acid, as by addition of normal butane and distillation of the butane and the hydrofluoric acid as a low-boiling mixture; it is then fractionally distilled to isolate the fluorine-free ethylbenzene. The acid extract is fortified by the addition of enough boron fluoride to make the total content of this compound approximately 3 mol per cent, and the fortified acid is passed to the alkylation step to be used as the catalyst for ethylation of additional benzene.

An especially useful specific application of the invention is in the manufacture of ethylbenzene, which is useful as an ingredient in aviation fuel and which is readily dehydrogenated to styrene for use in the manufacture of synthetic rubber. The alkylation of benzene with ethylene requires more or less drastic or adverse conditions, such as a reaction temperature appreciably above room temperature. Under such drastic or adverse conditions, the alkylation tends to give a product containing a relatively high proportion of unreacted alkylating agent, heavy unsaturated hydrocarbons, and organic fluorine-containing compounds such as alkyl fluorides and complex addition products of the alkylating agent with the catalyst. Extraction of the product, either before or after the separation from the unreacted benzene, with hydrofluoric acid in accordance with this invention effects an excellent removal of these materials, thereby improving the quality of the alkylation product.

Because the invention may be practiced otherwise than as specifically illustrated and described, and because many modifications and variations within the spirit and scope of the invention will be obvious to those skilled in the art, the invention should not be unduly restricted by the foregoing specification.

I claim:

1. A process for the removal of organic fluorine compounds from aromatic hydrocarbon materials containing the same, which comprises contacting such a hydrocarbon material with liquid hydrofluoric acid, correlating the relative amounts of said hydrocarbon and hydrofluoric acid and the temperature of contacting so as to insure the presence of a liquid hydrocarbon phase and of a liquid hydrofluoric acid phase, separating the resulting hydrofluoric acid extract from the hydrocarbon material, and freeing the extracted hydrocarbon material from a small proportion of dissolved hydrofluoric acid.

2. A process for the removal of organic fluorine compounds from aromatic hydrocarbon materials containing the same, which comprises contacting such a hydrocarbon material with liquid hydrofluoric acid, correlating the relative amounts of said hydrocarbon and hydrofluoric acid and the temperature of contacting so as to insure the presence of a liquid hydrocarbon phase and of a liquid hydrofluoric acid phase, separating the resulting hydrofluoric acid extract from the hydrocarbon material, and distilling from the extracted hydrocarbon material any residual, dissolved hydrofluoric acid.

3. A process of treating aromatic hydrocarbon material containing organic fluorine compounds, which comprises adding to said material an appreciable fraction of its own volume of a paraffin having three to five carbon atoms per molecule, contacting the resulting mixture with liquid hydrofluoric acid, correlating the relative amounts of said hydrocarbon and hydrofluoric acid and the temperature of contacting so as to insure the presence of a liquid hydrocarbon phase and of a liquid hydrofluoric acid phase, separating the resulting hydrofluoric acid extract from the hydrocarbon material, and freeing the extracted hydrocarbon material from the added paraffin and from dissolved hydrofluoric acid by fractional distillation.

4. A process of treating an aromatic hydrocarbon material containing organic fluorine compounds, which comprises contacting said hydrocarbon material with liquid hydrofluoric acid, correlating the relative amounts of said hydrocarbon and hydrofluoric acid and the temperature of contacting so as to insure the presence of a liquid hydrocarbon phase and of a liquid hydrofluoric acid phase, separating the resulting hydrofluoric acid extract from the hydrocarbon material, adding to the extracted hydrocarbon material an appreciable amount of a liquefied paraffin having three to five carbon atoms per molecule, and fractionally distilling the resulting mixture to remove the added paraffin and the hydrofluoric acid remaining dissolved in the hydrocarbon material.

5. The process of claim 4, in which the added paraffin is normal butane.

6. The process of claim 1, in which the mixture of hydrocarbon material and hydrofluoric acid is contacted at a temperature in the range of 10 to 50° F. prior to the separation of the hydrofluoric acid extract.

7. The process of claim 1, in which said aromatic hydrocarbon material is at least a part of a hydrocarbon mixture produced in the presence of a catalyst comprising at least one fluorine-containing compound.

8. The process of claim 1, in which said aromatic hydrocarbon material is at least part of the hydrocarbon mixture resulting from alkylation of at least one aromatic hydrocarbon in the presence of a catalyst comprising at least one fluorine-containing compound.

9. The process of claim 1, in which said aromatic hydrocarbon material is at least a part of the hydrocarbon mixture resulting from alkylation of at least one aromatic hydrocarbon in the presence of hydrofluoric acid as alkylation catalyst.

10. The process of claim 1, in which said aromatic hydrocarbon material is at least a part of the hydrocarbon mixture resulting from alkylation of benzene in the presence of a catalyst comprising a major proportion of hydrofluoric acid and a minor proportion of boron fluoride.

11. The process of claim 1, in which said contacting is countercurrent.

12. The process of claim 1, in which said aromatic hydrocarbon material is at least a part of the hydrocarbon mixture resulting from alkylation of at least one aromatic hydrocarbon in the presence of a catalyst comprising a major proportion of hydrofluoric acid and a minor proportion of boron fluoride, and in which said hydrofluoric acid extract is used as at least a part of the catalyst for the production of additional hydrocarbon material.

13. In a process of alkylating an aromatic hydrocarbon with an alkylating agent selected from the group consisting of olefins having two to five carbon atoms and of polar nonprimary alkyl compounds having three to five carbon atoms in at least one nonprimary alkyl group in the presence of a fluorine-containing catalyst, the improvement which comprises extracting at least a part of the resulting alkylation hydrocarbon product with substantially pure liquid hydrofluoric acid for a time that is sufficient for effecting substantial removal of organic fluorine-containing by-products of the alkylation.

14. In a process of alkylating benzene with ethylene in the presence of a catalyst comprising a major proportion of hydrofluoric acid and a minor proportion of boron fluoride, the improvement which comprises extracting at least a part of the resulting alkylation hydrocarbon product with concentrated relatively pure liquid hydrofluoric acid for a time that is sufficient for effecting substantial removal of organic fluorine-containing by-products of the alkylation.

15. In a process of alkylating an aromatic hydrocarbon with an alkylating agent in the presence of a fluorine-containing catalyst, the improvement which comprises extracting the alkylation product with liquid hydrofluoric acid.

16. A process of purifying an aromatic hydrocarbon material containing organic fluorine and sulfur compounds which comprises removing said organic fluorine and sulfur compounds by liquid-phase extraction with substantially pure hydrofluoric acid.

17. In a process for the alkylation of an aromatic hydrocarbon in the presence of a catalyst containing a major proportion of hydrofluoric acid and a minor proportion of boron fluoride, wherein the alkylate contains organic fluorine compounds, the improvement which comprises contacting in liquid phase a hydrocarbon fraction containing an alkylate from the alkylation step with concentrated liquid hydrofluoric acid under conditions such that there is a negligible amount of reaction of hydrocarbons catalyzed by said hydrofluoric acid and such that there is a reduction in the content of organic fluorine compounds in said hydrocarbon fraction, separating a hydrocarbon phase and a hydrofluoric acid phase, passing at least a portion of said hydrofluoric acid phase as catalyst to an alkylation step for producing said alkylate, and removing dissolved hydrofluoric acid from said hydrocarbon phase.

18. An improved process for the alkylation of an aromatic hydrocarbon, which comprises alkylating an alkylatable aromatic hydrocarbon in the presence of a liquid alkylation catalyst comprising hydrofluoric acid, passing a resulting mixture of hydrocarbons and catalyst to separating means, separating a hydrocarbon liquid phase from said liquid catalyst, contacting said hydrocarbon liquid phase with substantially pure concentrated liquid hydrofluoric acid to effect a purification of said hydrocarbon phase, passing liquid hydrofluoric acid effluent from said contacting to said alkylation, and removing dissolved hydrofluoric acid from a hydrocarbon phase effluent from said contacting.

19. The process of claim 18, in which said catalyst is hydrofluoric acid promoted with approximately 1 to 5 mol per cent of boron fluoride.

20. An improved process for the alkylation of an aromatic hydrocarbon, which comprises passing a liquid mixture of an alkylatable aromatic hydrocarbon and an alkylating agent to the lower part of a treating means comprising a lower alkylating zone and an upper extracting zone, passing to the upper part of said alkylating zone a liquid catalyst comprising recycled catalytic material and hydrofluoric acid from said extracting zone as hereinafter recited, intimately and countercurrently contacting said liquid mixture in said alkylating zone with said liquid catalyst under alkylating conditions to effect alkylation of said aromatic hydrocarbon, withdrawing from the bottom of said treating means liquid catalyst effluent from said alkylating zone and passing a portion of said catalyst as said recycled catalytic material to said treating means at an intermediate part between said extracting zone and said alkylating zone, passing substantially pure concentrated liquid hydrofluoric acid to an upper part of said extracting zone, passing a liquid hydrocarbon mixture resulting from said alkylation upwardly from said alkylating zone into the lower part of said extracting zone, countercurrently and intimately contacting said pure hydrofluoric acid and said hydrocarbon mixture in said extracting zone, passing resulting liquid hydrofluoric acid from the lower part of said extracting zone to the upper part of said alkylating zone, passing the resulting extracted hydrocarbon mixture from the top of said extracting zone and from the top of said treating means, and recovering therefrom alkylated aromatic hydrocarbons so produced.

21. A process for the removal of organic fluorine compounds from an aromatic hydrocarbon material containing the same as an impurity, which comprises contacting such an aromatic hydrocarbon material with liquid hydrofluoric acid, correlating the relative amounts of said hydrocarbon material and said hydrofluoric acid and the temperature of contacting so as to insure the presence of a liquid hydrocarbon phase and a liquid hydrofluoric acid phase, separating the resulting hydrofluoric acid extract from the aromatic hydrocarbon material, contacting said extract with a liquid paraffin hydrocarbon having three to five carbon atoms per molecule under conditions of temperature and relative proportions such as to insure the presence of separate liquid hydrocarbon and hydrofluoric acid phases, separating the resulting hydrocarbon extract, and subjecting both said extracted aromatic hydrocarbon material and said hydrocarbon extract to fractional distillation to recover relatively fluorine-free aromatic hydrocarbon materials.

22. The process of claim 21 in which each said contacting step is conducted at a temperature between about 20 and 100° F.

23. A process for the removal of organic sulfur compounds from an aromatic hydrocarbon material containing the same as an impurity, which comprises contacting such an aromatic hydrocarbon material with liquid hydrofluoric acid, correlating the relative amounts of said hydrocarbon material and said hydrofluoric acid and the temperature of contacting so as to insure the presence of a liquid hydrocarbon phase and a liquid hydrofluoric acid phase, separating the resulting hydrofluoric acid extract from the aromatic hydrocarbon material, contacting said extract with a liquid paraffin hydrocarbon having three to five carbon atoms per molecule under conditions of temperature and relative proportions such as to insure the presence of separate liquid hydrocarbon and hydrofluoric acid phases, separating the resulting hydrocarbon extract, and subjecting both said extracted aromatic hydrocarbon material and said hydrocarbon extract to fractional distillation to recover relatively sulfur-free aromatic hydrocarbon materials.

24. The process of claim 2 in which said contacting is conducted at a temperature between about 20 and 100° F.

25. The process of claim 23 in which said extraction is conducted at a temperature between about 20 and 100° F.

MARYAN P. MATUSZAK.